United States Patent
Hernandez et al.

(10) Patent No.: US 9,531,536 B2
(45) Date of Patent: Dec. 27, 2016

(54) SHARED KEYS IN A COMPUTERIZED SYSTEM

(71) Applicant: SSH Communications Security OYJ, Helsinki (FI)

(72) Inventors: Roman Hernandez, Helsinki (FI); Marko Teiste, Helsinki (FI); Antti Huima, Helsinki (FI); Tommi Linnakangas, Helsinki (FI)

(73) Assignee: SSH COMMUNICATIONS OYJ, Helsinki (FI)

( * ) Notice: Subject to any disclaimer, the term of this patent is extended or adjusted under 35 U.S.C. 154(b) by 0 days.

(21) Appl. No.: 14/638,722

(22) Filed: Mar. 4, 2015

(65) Prior Publication Data

US 2016/0261407 A1 Sep. 8, 2016

(51) Int. Cl.
*H04L 29/06* (2006.01)
*H04L 9/08* (2006.01)
*G06F 21/00* (2013.01)

(52) U.S. Cl.
CPC ............. *H04L 9/0825* (2013.01); *G06F 21/00* (2013.01); *H04L 9/083* (2013.01); *H04L 9/085* (2013.01); *H04L 9/0838* (2013.01); *H04L 9/0891* (2013.01); *H04L 9/0894* (2013.01)

(58) Field of Classification Search
CPC ............................. H04L 9/0825; H04L 9/085
USPC ....................................................... 380/282
See application file for complete search history.

(56) References Cited

U.S. PATENT DOCUMENTS

| | | | | |
|---|---|---|---|---|
| 6,148,404 A | * | 11/2000 | Yatsukawa | G06F 21/335 380/30 |
| 8,724,816 B2 | * | 5/2014 | Shi | H04W 12/02 380/270 |
| 2002/0191619 A1 | * | 12/2002 | Shafer | H04L 45/56 370/401 |
| 2008/0040775 A1 | * | 2/2008 | Hoff | H04L 63/062 726/1 |
| 2009/0106551 A1 | * | 4/2009 | Boren | H04L 9/0822 713/158 |
| 2009/0185685 A1 | * | 7/2009 | DeRobertis | H04L 9/0838 380/259 |
| 2009/0199290 A1 | * | 8/2009 | McCullough | H04L 63/0272 726/12 |
| 2009/0285399 A1 | * | 11/2009 | Schneider | H04L 63/061 380/278 |
| 2011/0196893 A1 | * | 8/2011 | Bates | G06F 17/30221 707/770 |
| 2011/0291803 A1 | * | 12/2011 | Bajic | G08B 13/2462 340/10.1 |
| 2012/0096263 A1 | * | 4/2012 | Shi | H04W 12/02 713/168 |

(Continued)

FOREIGN PATENT DOCUMENTS

WO    WO 2013/093209 A1    6/2013

*Primary Examiner* — David Garcia Cervetti
(74) *Attorney, Agent, or Firm* — Robert P. Michael, Esq.; Carter, DeLuca, Farrell & Schmidt, LLP

(57) ABSTRACT

Methods and apparatuses for managing keys in a computerized system are disclosed. A key is determined as a shared key, a key being a shared key when information of the key can be shared by a plurality of entities or would be shared by a plurality of entities as a result of a requested key management operation. A shared key operation is then performed based on the determining.

18 Claims, 2 Drawing Sheets

(56) References Cited

U.S. PATENT DOCUMENTS

| | | | | |
|---|---|---|---|---|
| 2012/0266209 A1* | 10/2012 | Gooding | ................ | H04L 63/20 726/1 |
| 2013/0117554 A1* | 5/2013 | Ylonen | .................... | H04L 9/08 713/151 |
| 2013/0227286 A1* | 8/2013 | Brisson | ................ | H04L 63/062 713/168 |
| 2013/0298182 A1* | 11/2013 | May | .................... | H04L 63/0272 726/1 |
| 2014/0075567 A1* | 3/2014 | Raleigh | ................ | H04W 12/10 726/26 |
| 2014/0164774 A1* | 6/2014 | Nord | .................... | G06F 21/602 713/171 |
| 2014/0215217 A1* | 7/2014 | Gronowski | ........... | H04L 9/0838 713/171 |
| 2015/0013000 A1* | 1/2015 | Linnakangas | ........... | H04L 63/08 726/14 |
| 2015/0222604 A1* | 8/2015 | Ylonen | ................ | H04L 63/062 713/171 |
| 2016/0044035 A1* | 2/2016 | Huang | ................ | H04L 63/0272 726/4 |

* cited by examiner

SHARED KEYS IN A COMPUTERIZED SYSTEM

FIELD OF THE INVENTION

This disclosure relates to computerized systems, and more particularly to shared keys in a computerized system.

BACKGROUND

Keys can be used in a computerized system for various reasons. An example of use of keys is encryption of data communicated and/or stored in a computerised system by means of a key. An encryption key can be seen as a piece of information that determines the functional output of a cryptographic algorithm or function, the key specifying the particular transformation between plain text and encrypt text. Without knowledge of the key the algorithm cannot produce any useful result. In addition to cryptography, other uses of keys are possible. These include authentication and authorisation functions, digital signatures and so-on. In general, keys are provided to enhance security, and hence often called security keys. A particular example of key usage is the Public Key Infrastructure (PKI). The PKI is based on pairing of private and public keys stored at appropriate locations where public keys can be associated with respective user identities by means of a Certificate Authority (CA).

In certain scenarios a key may be present in more than one entity or location. Thus information of the key may be shared by several hosts or other users. This is one example of shared keys. For example, such sharing of keys can occur in Network File Systems (NFS) or the like systems where a number of home directory files traditionally stored in host devices are stored in a common location. A shared key may also result from copying a key in several hosts.

Sharing of keys may take place by accident, may be unnoticed, or be forgotten as the time goes by. Hidden shared keys can pose a security risk, and/or can cause some unexpected operation or vulnerability in the system and/or for the user thereof. For example, a key management operation on a shared key may have unexpected consequences. The consequences and/or the severity thereof is not necessarily immediately, if at all, known to the commander of the key management operation. Users and administrators of the system may not even be aware of shared keys, and hence of effects a key management operation on a shared key may have on operation of the system and/or individual entities and/or security. The number of entities sharing a key or otherwise impacted by an action on a shared key can be considerable. In large computerized systems the number of such entities can be in the order of tens of thousands.

It is noted that the above discussed issues are not limited to any particular system and data processing apparatus but may occur in any system where shared keys may exist.

Embodiments of the invention aim to address one or several of the above issues.

SUMMARY

In accordance with an aspect there is provided a method for managing keys in a computerized system, the method comprising determining a key is a shared key, wherein a key is a shared key when information of the key can be shared by a plurality of entities or would be shared by a plurality of entities as a result of a requested key management operation, and performing a shared key operation based on the determining.

In accordance with another aspect there is provided an apparatus for management of keys, the apparatus comprising at least one processor, and at least one memory including computer program code, wherein the at least one memory and the computer program code are configured, with the at least one processor, to cause the apparatus to determine a key is a shared key, wherein a key is a shared key when information of the key can be shared by a plurality of entities or would be shared by a plurality of entities as a result of a requested key management operation, and cause a shared key operation based on the determining.

In accordance with a more detailed aspect a request for a key management operation in association with the key is detected and a shared key management operation is performed when the key is determined as being a shared key.

The shared key operation can comprise displaying information on the shared key. The display can comprise at least one of a notice the key is or will become a shared key, identity of at least one entity sharing the key, number of locations of the shared key, a list of locations of the shared key, number of trust relationships associated with the shared key, a prompt to use another key or to relocate the shared key from a shared location. The shared key operation may also cause changes to a key in at least one entity sharing information on the key. According to a possibility the shared key operation comprises relocating at least one key from a shared location to another location. The key can be relocated to a local directory from a file system serving a plurality of hosts. The shared key operation can also comprise at least one of preventing the key management operation to proceed, removing an authorization of a key and blacklisting a key.

The determining the key is a shared key comprises determining at least one of the key is associated with at least two hosts, the key is associated with at least two user accounts, a host associated with the key is linked to a file system for storing directories of a plurality of hosts, the key is located in a shared location, and a command resulting sharing of the key. A different shared key operation can be triggered for different shared keys.

A key management server providing the operations may also be provided.

Certain more detailed aspects are evident from the detailed description.

SUMMARY OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures.

DETAILED DESCRIPTION

Figure 1:
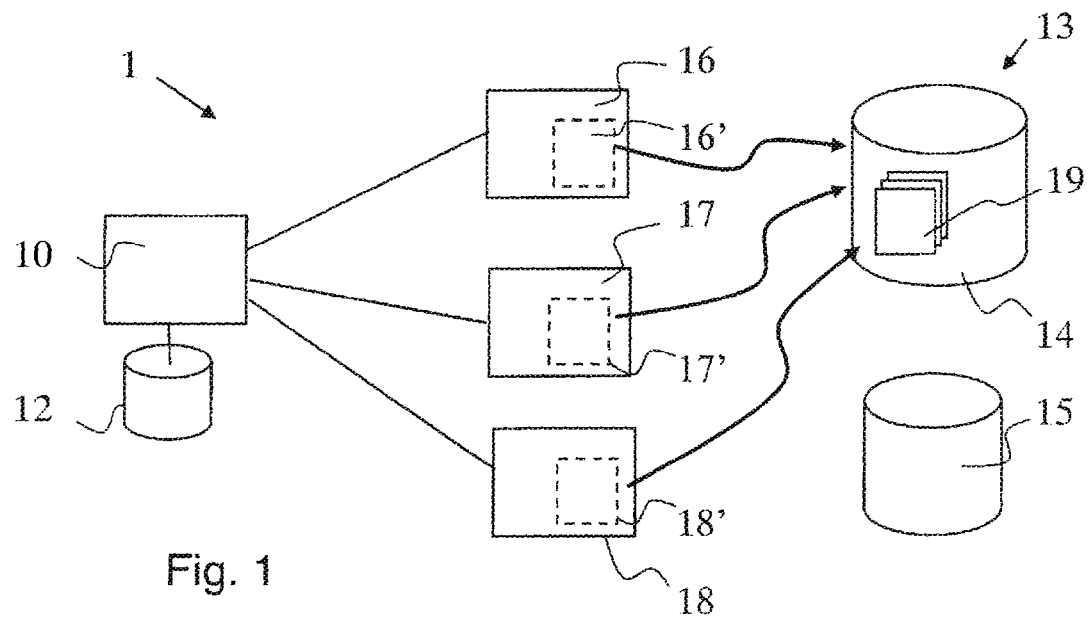
FIG. 1 illustrates an example of a data network setup where the invention can be embodied.

FIG. 1 shows an example of a computerized system 1 where the herein described principles may be embodied. The system can be provided in e.g. an Intranet of an enterprise or similar organisation or a larger network. Communications between the various entities can be e.g. an IPv4 (Internet Protocol version 4) or IPv6 (Internet Protocol version 6) based.

The exemplifying arrangement of FIG. 1 comprises a network element 10 arranged for key management operations. For example, a specific key manager server can be provided for managing keys for various users. A particular example of key manager products is Universal Key Manager™ by SSH Communications Security OYJ of Helsinki, Finland. Various aspects of an exemplifying key manager are disclosed in U.S. patent application Ser. No. 14/367,462 (which is related to PCT International Publication No. WO 2013/093209A1) assigned to SSH Communications Security OYJ, which disclosure is incorporated herein by reference.

A user or administrator performing a key management operation can interface the key manager and give relevant key management commands thereto. A database 12 for storing information relating to the keys and key management operations and connected to the key manager is also shown.

The key manager 10 interfaces host devices 16, 17 and 18. Each host device is associated with a home directory 16', 17' and 18'. The associated home directories are drawn with dashed lines for reasons explained below. A home directory is typically a file system directory on a multi-user operating system containing files for a given user of the system. A home directory of a user can contain data such as files for the given user, configuration files of preferred settings for any software the user has used, web browser bookmarks, passwords to external services accessed via a given software and so on. Further, one or more keys of the user can be stored in the home directory. It is noted that the number of host devices and associated home directories can be considerably higher in a system, for example in the order of thousands or even tens of thousands of home directories.

Certain examples described below relate to embodiments where data in the home directories is actually stored in a network file system (NFS), denoted generally by 13 in FIG. 1. The NFS 13 is shown to comprise databases 14 and 15. The home directories of the host devices 16, 17 and 18 are stored in file 19 of database 14. Thus the arrangement is such that home directories of different users, rather than being stored in host devices of the users, are actually stored in a file shared by several hosts. The home directories can store security keys by default, and therefore the security keys are also stored in a shared storage location rather than in the host devices. A key file or authorisation can thus reside in a shared network volume or multiple accounts within a single host can use the same directory. As a result, the security keys can be accessed and thus shared by a plurality of hosts.

NFS mounted home directories are a good example of scenarios where keys are shared. However, is noted that these are only an example of keys being stored in a shared location and that the issues addressed herein are not exclusive to NFS. Shared keys can exist also in other arrangements and situations where keys can be physically in a single file but present in multiple hosts. Examples of such arrangements include clusters using a shared disc as well as other types of shared/distributed file systems. Examples of these include Server Message Block (SMB), Common Internet File System (CIFS) and Distributed File System (DFS).

Figure 2:
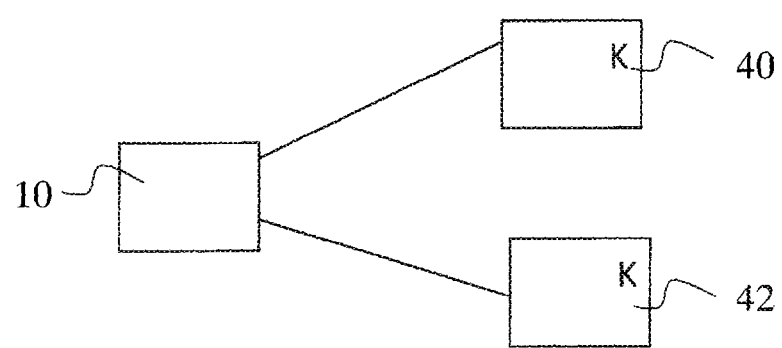
FIG. 2 shows an example of copied keys.

A shared key may be created e.g. in situations where a key is unintentionally affected by an operation on another key. This may happen e.g. in situations where two or more keys are physically located the same file on a disc or other storage medium. This scenario is exemplified by FIG. 1 where keys in home directories of a plurality of hosts 16, 17, 18 are stored in one file 19. Another example of shared keys is where a key has been copied such that a key can be present in multiple locations either in a host or across multiple hosts. The latter scenario is illustrated by FIG. 2 where key K is copied to two different host entities 40 and 42 controlled by a key manager 10.

A key can be authorised, and the authorisation can be shared by a plurality of entities. Shared authorization can be created e.g. because of shared locations of keys. In this specification the term shared key shall thus be understood also to refer to a shared authorization of a key.

Key management operations on shared keys can have various unintended and even harmful side effects. These include granting authorisations to multiple hosts, identification of keys incorrectly as missing or appeared, same data being scanned for multiple times, operations on the data being not performed in the optimal host and so forth. A cause of this problem is the current model of treating the location of the data as a singular unique instance identified by a path to a file in a single host. However, a key or an authorisation of a key can be shared between multiple users and/or hosts. All operations on the keys or authorisations can thus become immediately visible to other locations, and thus the key data can become unintentionally shared.

The following describes more detailed examples of shared keys at a key manager entity 10. Typically a key manager can use and modify key data. A large amount of hosts can mount home directories from network file systems. However, the key manager is not necessarily aware of this and/or that keys on these hosts are actually shared keys. This can cause problems with shared keys e.g. because when a key associated with one host is anyhow modified (for example deleted) this can cause the key manager to determine that the particular key has gone missing on the rest of the hosts which are also mounting the same NFS volume.

Operations applied to shared keys can have wider effect than what might have been intended or is reasonably expected. However, the user commanding the key manager may not be aware of the actual effect of the key management operation. For example, an authorizer of a key may not realise that all shared keys may become authorized. Thus e.g. creating a new authorisation for user at host1 to user at host2 may also inadvertently create authorisation to user at host3 and user at host4.

Scanning for keys by a key manager can also be suboptimal unless information of shared keys is available since the same key information may become scanned multiple times. In worst case scenario this can result server performance issues on client environment, typically in NFS auto mounted directories. Scanning without knowledge of shared keys on can also produce false information. Operations done by the key manager on one location can result in keys or authorisations being flagged as appeared, missing, locally modified and so forth in other locations. Operations may even fail if they are attempted in "wrong" locations although they would succeed if done in the correct location. For example, a location can be read-only mounted on host1 and read-write mounted on host2. Operations should be performed on host2 even if the "target" is host1.

Keys can also be shared by copying. This results multiple copies of the same key or authorisations of a key to exist in multiple independent locations. Operations on one location are not immediately visible to the other locations. An example of these scenarios are roaming profiles. Operations done on one host can get overridden when the mirroring happens. For example, authorisation for one user at a host from a client may become erased when the mirroring is performed and the associated file is overridden.

Figure 3:
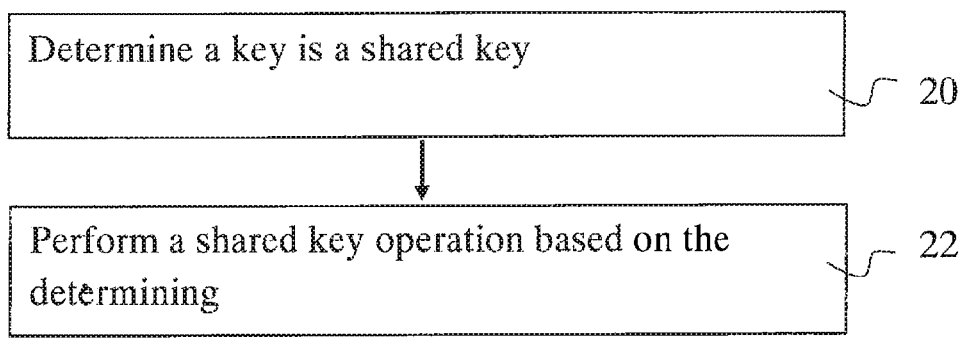
FIGS. 3 and 4 show flowcharts in accordance with certain embodiments.

FIG. 3 shows a flowchart in accordance with an embodiment for operation where possibility of shared keys is taken into account at a key manager. It can be determined at 20 that a key is a shared key. A key can be determined to be a shared key when information of the key can be shared by a plurality of entities or would be shared by a plurality of entities as a result of a requested key management operation. A shared key operation can then be performed at 22 based on the determining.

The determining can be based on determination of various events. For example, it is possible to determine that a key is shared key because the key is associated with at least two hosts. It can also be determined that a key is associated with at least two user accounts. Detection that a host associated with a key is linked to a file system for storing directories of a plurality of hosts can also be seen as an indication of a shared key. Similarly, if a key is located in any other shared location it can be determined as a shared key. A detected command that would result sharing of a key is also a clear indication of a shared key.

Figure 4:
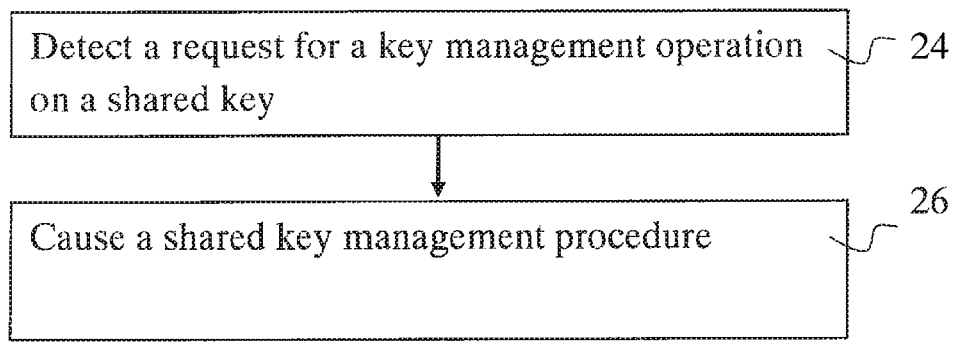

FIG. 4 shows an example where a key manager can determine that a key management operation is applied or is to be applied on a key. For example, the key manager may receive at 24 a request for a key management operation on the key. If the key is determined to be a shared key, a shared key management procedure is triggered at 26 instead of, or in addition to, the requested key management operation.

In accordance with an embodiment the shared key operation comprises generation of an indication of a shared key for a user. A display or another indication can be generated in response to determining that a key is a shared key. More examples of shared key actions will be provided later.

Determination of a shared key can be provided in various manners. According to a possibility key manager scans each host to determine shared keys. For example, shared keys can be determined based on determination whether there are links (paths) from a host to a file sharing location. Based on such paths it can be determined that key(s) associated with the host is/are actually stored in a shared location.

In accordance with a possibility detection of a command line or Application Program Interface (API) with a command that would result creation or use of a shared key triggers shared key operation.

In accordance with a possibility sharing of private and authorized keys is detected. A key manager determines that a key on host A is the same as a key on host B. This can be done regardless of whether the keys are mounted on an NFS home directory or multiple hosts in a cluster are sharing a storage location such as a disc.

The key manager can differentiate between different shared keys and/or uses thereof. Consider e.g. a scenario where multiple hosts use the same file for storing keys and hence shared keys would be a problem for both private and authorized keys as any change to one is reflected in all instances where the key is shared. However, scenarios where keys have been copied may only be problematic from the point of view of private keys and thus the policy can be that only this situation should be avoided. For example, a report or alert can be issued or other action can be taken accordingly based on the differentiation. Copied authorised keys where the same key is authorised to a multiple of hosts can sometimes be desirable and intentional, and does not necessarily need to trigger any action.

A mechanism for providing information on locations of keys and/or authorizations can be provided for the shared key determination. The determination operation can be manual, semi-automatic and/or automatic. For example, a key manager can continuously monitor the system to detect potential shared keys. The key manager can scan hosts one at the time. According to a possibility the key manager analyses hosts in appropriate groups, e.g. one or a few groups at a time.

In accordance with an embodiment a key manager automatically detects network mounts when onboarding hosts, i.e. adding new hosts to a key management system. An initial configuration may be provided manually when onboarding a host. Detecting and mapping of hosts may also be provided automatically. As the mounts can change (new ones are added, old ones removed and so forth), it is preferable to arrange automatic detection and updating of network mount information. According to a possibility configuration files are read to determine which file servers hold keys.

Information of the key locations and/or authorizations, for example a mapping or listing of the mounts, can be stored in database 12 of the key manager 10 of FIG. 1.

A shared key operation triggered in response to determination of a key management operation on shared keys or an operation resulting a shared key can comprise various actions. According to a possible action a display is generated for conveying information on shared keys that have been determined to exist or to result from a key management operation. For example, a key manager can cause presentation of a display for a user commanding the operation and/or for an administrator of the system when the key affected by the operation is a shared key. A display can be presented for example in the form of a list of private and authorised keys or a list of private keys via a web based user interface. A specific icon may be displayed as a notification warning that a key is to be shared. Indication of a shared key can also be displayed in a list of keys presented based on a command line such as "list private keys", "list authorised keys" and "list authorisations". When displaying information on a single key an indication that the key is shared can be presented.

Information of the number of locations where a shared key is present can also be displayed. A complete list of all locations where a shared key is present can also be displayed. Information on the extend of key sharing can be valuable for example because the severity of the problem is a lot less if the key is shared by two entities compared to when the key is shared by for example 30000 entities, and would thus require different actions.

The requested key management action on a shared key may be allowed even if the key is determined as being a shared key based on predefined rules. The key manager can also configured to present a warning or another notification to the user that the key is a shared key and/or information regarding the (possible) consequences of such actions. For example, information can be provided for the user that removal of a key on NFS will also remove the key from X number of hosts. A listing of hosts loosing the key may also be provided. A visual warning can also be given before performing actions that would result in shared keys. Thus determination of shared keys in the system provides information and visibility on keys that are used in the system and in particular if there are shared keys.

It is possible to have a rule according to which the requested key management operation is not permitted. A descriptive error message may be returned to the user attempting the refused key management operation. The refusal can be overridden and the key management operation be permitted by the administrator of the key manager. The administrator can specify for example a parameter or command enabling forced use of the action.

The shared key operation can also comprise key relocation. Key relocation is a way for a key manager to remediate a situation caused by shared authorised keys. An authorised key or keys can be moved away from the shared location into a location that is local to the host and owned by the root. Key manager can be configured to allow simultaneous key relocation operations on multiple servers with shared keys or key locations. Thus a key that has been moved to e.g. a NFS file together with other data in a home directory can be brought back into a local directory in the host while the other data can remain the NFS file.

Determined shared key or keys can also be addressed by removal of the key or keys. For example, an authorised or private key can be removed from a storage location. When performing remove action on a shared key a key manager can be configured to alert a user that the key is a shared key and is to be removed. A display informing of the number of hosts and users that are sharing the key can also be presented. For private keys the number of hosts and users that have copies of the key can be presented.

If a key manager administration decides to remove the key the key is removed from the shared location. An audit message can be generated that a shared key was removed from X number of hosts. An audit report for a host where the key was shared can comprise an entry containing information that the shared key was removed.

According to a possibility authorization of a key in shared location is removed but the key as such remains stored therein.

Removal of a key from a shared location does not need to cause any alerts on such hosts where the key, although being shared and removed from the shared location, remains in use.

A shared key can also be blacklisted. The arrangement can be such that copies of private keys are not automatically removed except when a blacklist action is performed.

Another example of a key management operation is restoring of authorised keys. When performing a restore action on a shared authorised key a key manager can generate a warning that the restored key will be shared by others. A display of the number of hosts and users that will be sharing this key may be generated. The number of known trust relationships that will be created may also be displayed.

Authorisations may also be added. When authorisation is added for a shared private key a key manager can be configured to avoid generating unencrypted private keys that would result in a shared key. For example, this may happen when the home directory is stored in a network file system. The key manager can be configured to generate keys in a local path on the host in such a way that they would be used by the installed client. In cases where the key manager cannot do that it can exclusively warn the user that the generated key would be a shared key before proceeding with the action.

When adding authorisation for a shared private key which already exists (with reused private keys feature enabled) a key manager can be configured to show a warning and recommend generating a new key instead. The arrangement can be such that the administrator of the key manager shall exclusively allow this action before the procedure can continue.

Authorisation can be added to a destination that would result in a shared key. This is a possible scenario for example when authorised key file is stored on NFS. In such case the key manager can be configured to present a warning and recommend updating the server configuration to relocate authorised keys to a local path on the server. The key manager can also display how many trust relationships will be created. In accordance with a scheme explicitly acceptance of the addition of the authorization by the administrator of the key manager is required for the operation to proceed.

A key manager can perform a key management action where different options on authorised keys can be set on a shared authorised key. Options such as 'allow restrictions' and/or 'deny restrictions' can be placed on the shared key. This can be disadvantageous in certain situations since the number of servers that will be affected might be considerably higher than what the administrator believes. The key manager can be configured to display a warning that the key is a shared key and display the number of hosts and users that are sharing the key.

A key manager can also allow performing key renewal operations on shared keys. In this regard same concerns apply as in relation to adding authorisations. A key manager can be configured to generate an alert when shared keys would be affected by key renewal, for example when authorised key would be shared, and recommend key relocation for host that have shared authorised keys. In the case of renewing shared private keys, any new private keys that are generated should not allowed to be shared.

In accordance with a possibility a key management operation is applied to keys shared on clusters. In clusters multiple hosts can reuse the same physical disc or other medium or multiple host can be part of a cluster but each host has a separate physical disc or other medium. In the latter scenario a key manager can be configured to allow association together of hosts that are part of the cluster so that adding an authorisation to one host would result in automatic addition to authorisation to the other servers in the cluster. The same would apply to other key operations.

In accordance with an embodiment key relocation is required before being able to make changes to the key. This may be applied for example to actions such as key generation, adding authorisation, renewals and so on. In certain scenarios the administrator shall be provided with the possibility to remove/blacklist a key even if the key is a shared key without having to perform any key relocation.

Figure 5:
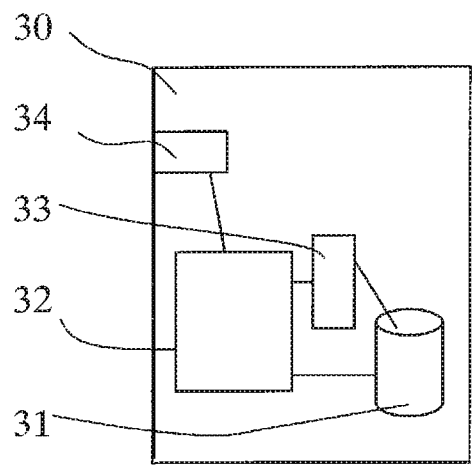
FIG. 5 shows data processing apparatus.

FIG. 5 shows an example of control apparatus for providing an entity capable of processing the above described determining shared keys and triggering shared key actions in response thereto. The control apparatus 30 can be for example integrated with, coupled to and/or otherwise controlling the key manager 10 of FIG. 1 to provide control on use of shared keys. For this purpose the control apparatus comprises at least one memory 31, at least one data processing unit 32, 33 and an input/output interface 34. Via the interface the control apparatus can be coupled to the transport entities of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

We claim:

1. A method for managing keys in a computerized system, the method comprising:
    detecting a request for a key management operation in association with a private key;
    determining whether the private key is a shared private key, wherein a private key is a shared private key when at least one of the private key is usable by a plurality of entities, and is available for use by a plurality of entities, as a result of the requested key management operation, and
    performing a shared private key operation instead of, or in addition to, the requested key management operation on the private key when it is determined that the private key is a shared private key.

2. The method according to claim 1, further comprising displaying information regarding the shared private key.

3. The method according to claim 2, further comprising displaying at least one of:
    a notice that the private key is or will become a shared private key,
    an identity of at least one entity using the private key,
    a number of locations of the shared private key,
    a list of locations of the shared private key,
    a number of trust relationships associated with the shared private key, and
    a prompt to use another key or to relocate the shared private key from a shared location.

4. The method according to claim 1, wherein the shared private key operation includes causing changes to a private key in at least one entity using the private key.

5. The method according to claim 1, wherein the shared private key operation includes relocating the private key from a shared location to another location.

6. The method according to claim 5, where the private key is relocated to a local directory from a file system serving a plurality of hosts.

7. The method according to claim 1, wherein the shared private key operation includes preventing a requested key management operation to proceed.

8. The method according to claim 1, wherein the shared private key operation includes at least one of removing an authorization of a private key and blacklisting a private key.

9. The method according to claim 1, wherein the determining that the private key is a shared private key comprises determining at least one of:
    the private key is associated with at least two hosts,
    the private key is associated with at least two user accounts,
    a host using the private key is linked to a file system for storing directories of a plurality of hosts,
    the private key is located in a shared location, and
    a command resulting in sharing of the private key.

10. The method according to claim 1, wherein the private key is stored in a file system serving a plurality of hosts.

11. The method according to claim 1, further comprising triggering a different shared private key operation for different shared private keys.

12. An apparatus for management of keys, the apparatus comprising at least one processor, and at least one memory including computer program code, wherein the at least one memory and the computer program code are configured, with the at least one processor, to cause the apparatus to:
    detect a request for a key management operation in association with a private key;
    determine that the private key is a shared private key, wherein a private key is a shared private key when at least one of the private key is usable by a plurality of entities, is available for use by a plurality of entities, as a result of the requested key management operation, and
    cause a shared key operation to be performed on the private key instead of, or in addition to, the requested key management operation when it is determined that the private key is a shared private key.

13. The apparatus according to claim 12, wherein the apparatus is further configured to cause a display of information regarding the shared private key.

14. The apparatus according to claim 13, wherein the display comprises at least one of:
    a notification that the private key is or will become a shared private key,
    an identity of at least one entity using the private key,
    a number of locations of the shared private key,
    a list of locations of the shared private key,
    a number of trust relationships associated with the shared private key,
    a prompt to use another key, and a prompt to relocate the shared private key from a shared location.

15. The apparatus according to claim 12, wherein the apparatus is further configured to, when a private key is a shared private key, cause at least one of:
- a change to a private key in at least one entity using the shared private key,
- a relocation of the private key from a shared location to another location,
- a relocation of the private key to a local directory from a file system serving a plurality of hosts,
- a prevention of a requested key management operation to proceed,
- a removal of an authorization of a private key, and
- a blacklisting of a private key.

16. The apparatus according to claim 12, wherein the apparatus is further configured to determine that the private key is a shared private key in response to a determination of at least one of:
- the private key is associated with at least two hosts,
- the private key is associated with at least two user accounts,
- a host using the private key is linked to a file system for storing directories of a plurality of hosts,
- the private key is located in a shared location, and
- a command resulting in sharing of the private key.

17. The apparatus according to claim 12, wherein the apparatus is further configured to trigger a different shared private key operation for different shared private keys.

18. The apparatus according to claim 12, further comprising a key management server.

\* \* \* \* \*

UNITED STATES PATENT AND TRADEMARK OFFICE
CERTIFICATE OF CORRECTION

PATENT NO. : 9,531,536 B2
APPLICATION NO. : 14/638722
DATED : December 27, 2016
INVENTOR(S) : Roman Hernandez et al.

Page 1 of 1

It is certified that error appears in the above-identified patent and that said Letters Patent is hereby corrected as shown below:

On the Title Page

Item (74) Attorney, Agent, or Firm, change "Robert P. Michael, Esq." to --Robert P. Michal, Esq.--

Signed and Sealed this
Twenty-first Day of March, 2017

Michelle K. Lee
*Director of the United States Patent and Trademark Office*